United States Patent Office 3,184,516
Patented May 18, 1965

3,184,516
THIAPYRANS AND THEIR USE IN PREPARING POLYENES
Albert J. Chechak and Charles D. Robeson, Rochester, N.Y., assignors to Eastman Kodak Company, Rochester, N.Y., a corporation of New Jersey
No Drawing. Filed July 27, 1960, Ser. No. 45,561
The portion of the term of the patent subsequent to June 26, 1978, has been disclaimed and dedicated to the Public
15 Claims. (Cl. 260—666)

This invention relates to a new class of heterocyclic compounds and to their use in the preparation of highly unsaturated compounds.

It is an object of this invention to provide a new class of sulfur-containing heterocyclic compounds.

It is another object of this invention to provide novel compounds that can be readily converted into symmetrical polyene compounds.

It is still another object of this invention to provide a novel monomeric thio-intermediate that can be readily converted to $\beta$-carotene.

It is also an object of this invention to provide novel oxygen-containing compounds that can be readily converted into carotenoids suitable for use in poultry feeds as pigmenters.

It is likewise an object of this invention to prepare a novel cyclic sulfur-containing derivative from unsaturated aldehydes.

These and other objects of the invention are attained by means of this invention as described hereinafter with reference to certain preferred embodiments thereof.

The novel heterocyclic compounds of the invention are prepared by reacting at a low temperature hydrogen sulfide and an unsaturated aldehyde having the formula

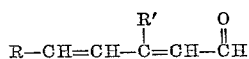

wherein R is a monovalent organic radical substantially inert to hydrogen sulfide during the reaction, and wherein R' is an alkyl radical. The novel class of compounds resulting from this reaction are substituted thiapyrans having the formula

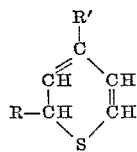

A wide variety of unsaturated aldehydes can be employed in the present process. In the aldehyde reactant having the formula

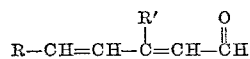

R is a monovalent organic radical inert to the reaction, and particularly radicals consisting of carbon and hydrogen atoms, or carbon, hydrogen and oxygen atoms. Typical radical substituents for R include radicals having such structures as

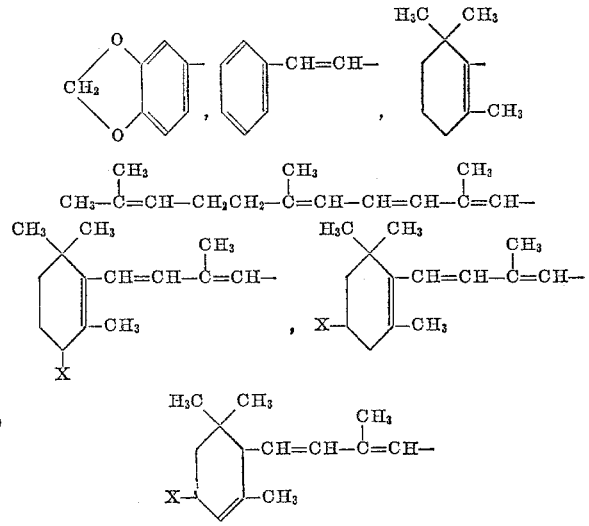

wherein X is a hydrogen atom or an oxygen-containing radical including oxygen atoms in the form of an oxo or keto radical (=O), an alkoxy radical (—OR″) wherein R″ is an alkyl radical typically having 1 to 18 carbon atoms and preferably 1 to 4 carbon atoms, or an acyloxy radical

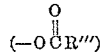

wherein R‴ is an alkyl radical typically having 1 to 18 carbon atoms and preferably 1 to 4 carbon atoms, as well as such other well-known radicals as phenyl, naphthyl, benzyl, benzyloxy, biphenylyl, bornyl, butadienyl, cyclohexyl, ethynyl, propyl, geranyl, isobutyl, isobutoxy, isopentyl, 2-methylallyl, o-methylbenzyl, neryl, nonadecyl, vinyl and other related radicals substantially inert in the present reaction. Preferred radicals for the substituent R are hydrocarbon radicals terminating in an ionyl ring having the carbon structure,

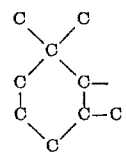

The R' substituent in the unsaturated aldehyde employed in the present process is an alkyl radical, desirably containing 1 to 6 carbons. Typical R' radicals include methyl, ethyl, propyl, isopropyl, n-butyl, isobutyl, tertiary butyl, n-pentyl, 1,1-dimethylpropyl, n-hexyl, n-octyl, n-decyl, n-dodecyl, n-pentadecyl and other well-known alkyl radicals. Methyl is the preferred radical for the substituent R' in the subject aldehyde reactant.

A wide variety of suitable unsaturated aldehydes can be employed which have the above described substituents. A preferred unsaturated aldehyde reactant is vitamin A aldehyde. The thiapyran prepared from vitamin A aldehyde can be readily converted into $\beta$-carotene, $\beta$-carotene being a vitamin A-active material that is useful for fortifying and coloring food products such as margarines. Vitamin A aldehyde has the formula

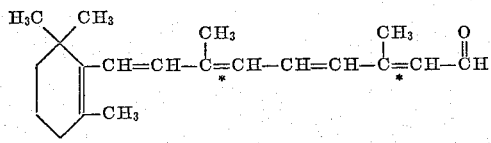

Vitamin A aldehyde can exist in the form of several geometrical isomers based on various cis and trans configurations around the 2 and 6 positions starred in the above formula. Any of such isomers, or admixtures thereof, can be suitably employed in the present process. Herein we have referred to the trans as well as the cis isomeric configurations in our nomenclature. Some workers in this art have used other nomenclature and specifically designate only the cis isomeric configuration. Reference is made to the article by Robeson, Blum, Dieterle, Cawley and Baxter, Journal of the American Chemical Society, 77, pages 4120–4125 (1955), wherein is described various geometrical isomers of vitamin A aldehyde and their methods of preparation.

In accordance with the invention the subject substituted thiapyrans are prepared by reacting the unsaturated aldehyde with hydrogen sulfide. Hydrogen sulfide is intimately admixed with the aldehyde, conveniently by merely bubbling the gaseous hydrogen sulfide through the aldehyde in a liquid reaction medium. Preferably the reaction medium is substantially saturated with hydrogen sulfide during the reaction. Stirring, shaking or related methods for agitating reaction mixtures are desirably employed to facilitate the reaction. A particularly effective method for sulfurating the unsaturated aldehyde is to prepare a saturated solution of hydrogen sulfide in a suitable solvent and to slowly add the unsaturated aldehyde thereto. This sulfuration of the unsaturated aldehyde is continued until substantially no more hydrogen sulfide is taken up or reacts therewith. The sulfuration reaction period varies widely with such factors as the rate the hydrogen sulfide and the unsaturated aldehyde are combined, the amount of agitation of the reaction mixture, the dilution of the reactants, the nature of the solvent, the reaction temperature and related reaction variables. Under more commonly employed reaction conditions, the sulfuration can be substantially completed in about 1 to 6 hours, although longer or shorter reaction periods may be desired with certain reaction conditions. It can be determined from the infrared absorption spectrum of a sample of the reaction mixture when the sulfuration reaction is complete. A stoichiometric excess of hydrogen sulfide is generally employed, although lesser amounts can be utilized, in the latter case a smaller portion of the aldehyde being converted to a thiapyran. While atmospheric pressures are generally employed in the present reaction, subatmospheric or super atmospheric pressures can also be utilized.

The unsaturated aldehyde and hydrogen sulfide are reacted at a low or depressed temperature lower than room temperature (about 20° C.) Temperatures in the range of about −40° C. to 15° C. are usually employed and temperatures in the range of about −20° C. to 10° C. are preferred, during the sulfuration of unsaturated aldehydes to prepare thiapyrans in accordance with the invention.

The sulfuration of the unsaturated aldehyde with hydrogen sulfide is effected in a liquid reaction medium. No solvent need be employed when employing unsaturated aldehydes that are liquid under the reaction conditions, although solvents are preferably employed. A wide variety of polar and non-polar solvents can be utilized, including solvents that are acidic, basic or substantially neutral. Also, the range of ratios of aldehyde solute to solvent can be widely varied in accordance with usual chemical practice. The reactants in the solvent medium substantially reduce its freezing point, and thus, a wide range of solvents can be suitably employed in the low-temperature reaction conditions employed in preparing the subject substituted thiapyrans.

Particularly useful solvents are organic amine solvents, including primary, secondary and tertiary organic amines. Typical suitable organic amines include the members of the pyridine series such as pyridine, 1-picoline, 2-picoline, 3-picoline, 1,2-lutidine, 1,3-lutidine, 2,4-lutidine, 2,6-lutidine, 3,6-lutidine and similar well-known pyridines; aniline, dimethylaniline, diethylaniline, quinoline, piperidine, amino-pyridine, morpholine, dimethylamine and similar well-known organic amines. Likewise, mixtures of more than one amine solvent can be employed.

Various acidic solvent reaction media can also be employed. Aqueous solutions of such organic carboxylic acids as acetic acid, trichloroacetic acid and related acids are suitable. Organic acid-containing solvents are usually prepared to contain 1 to 25% by weight organic acid and the remainder an aqueous-alcohol mixture. The water in the alcohol portion of the solvent mixture usually is less than about 20% by weight of the solvent mixture, too high a proportion of water limiting the solubility of the unsaturated aldehyde. Typical acidic reaction media include an organic carboxylic acid in an aqueous alcohol such as ethanol, isopropanol, n-butanol and other aliphatic monohydric alcohols containing at least 2 carbon atoms and preferably 2 to 4 carbon atoms.

Also, various substantially neutral solvents can be employed as the reaction media, including various aliphatic monohydric alcohols having at least 2, and preferably 2 to 10, carbon atoms, ethers such as diethyl ether and diisopropyl ether, hydrocarbons such as benzene, petroleum ethers and the like.

The reaction mixture resulting from the reaction of the unsaturated aldehyde and hydrogen sulfide in accordance with the invention contains a substituted thiapyran. The present thiapyrans can be removed from the reaction mixture by conventional chemical working-up or purifying methods such as solvent extraction, chromatographic adsorption and the like.

The aldehyde reactant employed in the present process to prepare the subject substituted thiapyrans has at least two olefinic bonds in conjugation with the terminal aldehyde group. On treatment with hydrogen sulfide at a low temperature in accordance with the present process, these olefinic bonds rearrange with the simultaneous replacement of oxygen by sulfur to form the subject thiapyrans in accordance with the following equation:

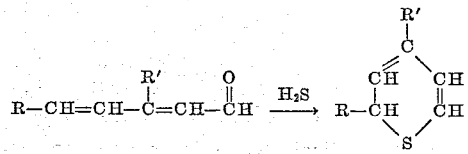

The subject thiapyrans are monomeric materials. It is known in the art that the more common aldehydes of the formula

react with hydrogen sulfide under conventional reaction conditions to form trimers in accordance with the following equation

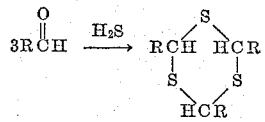

reference being made to "Chemical Reviews" 39, page 5 (1946). In view of this fact it was unexpected when we obtained the subject monomeric thiapyrans in the present instance from certain specific unsaturated aldehydes.

The substituted thiapyrans of the invention have considerable utility as they can be readily converted to symmetrical polyene compounds by heating in the presence of a desulfurating agent. The preparation of such symmetrical polyene compounds can be represented by the following equation:

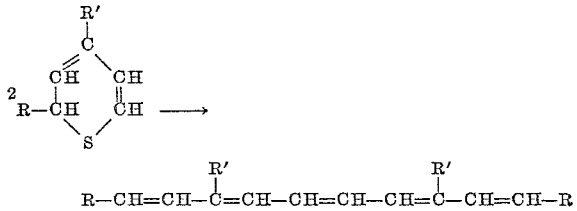

After the sulfuration of the aldehyde reactant, excess or unreacted hydrogen sulfide can be readily removed from the reaction mixture. The reaction mixture can be stirred or agitated by the other means at a temperature above the low temperature sulfuration reaction conditions employed until the hydrogen sulfide is substantially removed. The reaction mixture can also be worked-up or purified by solvent extraction, adsorption or related methods in accordance with usual chemical practice, although such a working-up step is not necessary in the present synthesis.

The sulfurated product resulting from the reaction of the aldehyde and hydrogen sulfide at low temperatures can be converted to a highly unsaturated compound such as β-carotene by desulfurating the resulting reaction product, that is, by removing the sulfur from the thio-intermediate. This desulfuration reaction can be readily effected with a wide variety of desulfurating agents or catalysts and reaction conditions. As the unsaturated thio starting materials are labile and susceptible to oxidation and chemical change, particularly those of the vitamin A aldehyde series, the desulfuration is preferably effected in an inert atmosphere such as under carbon dioxide, nitrogen, helium or related inert gases. Substantially anhydrous conditions are more generally utilized although such conditions are not necessary with all desulfurating agents.

The present desulfuration reaction is effected at an elevated temperature, usually at least about 35° C. and below the temperature at which substantial deterioration or decomposition of the highly unsaturated reaction product takes place, temperatures in the range of about 50° C. to 125° C. being more usually employed, and temperatures of 80° C. to 120° C. being preferred. The desulfuration is preferably effected in an organic amine solvent such as can be used in the sulfuration reaction described above. However, a wide variety of other conventional polar and non-polar organic solvents such as can be used in the sulfuration reaction described above that are substantially inert to the reaction can be utilized. The desulfuration is carried out until the sulfur is removed from the sulfurated aldehyde which is thereby converted to a highly unsaturated compound such as β-carotene. The desulfuration reaction period varies widely with such variables as the temperature, the nature of the solvent, the type of desulfurating agent or catalyst employed and related variables. Under more commonly employed reaction conditions, the desulfuration can be substantially completed in about 1 to 10 hours, although as long as about 20 hours may be desirably employed if no desulfurating agent or catalyst is employed. The completion of the desulfuration reaction can be determined from the infrared absorption spectrum of the reaction product.

Siutable desulfurating agents or catalysts include such metallic catalyst materials as zinc, zinc-amalgam and copper, usually in powdered form. Zinc-amalgam is preferred. The amount of such metallic desulfurating catalyst material utilized can be widely varied, although at least about 0.1 part, and more usually 0.1 to 10 parts, by weight of catalyst to one part by weight of the sulfurated aldehyde or thio-intermediate are utilized.

Likewise, the desulfuration can be facilitated with such metal alkoxides as aluminum alkoxides or boron alkoxides of the formulas $Al(OR)_3$ or $B(OR)_3$ wherein R is an alkyl group desirably having 1 to 8 carbon atoms and preferably 1 to 4 carbon atoms. Typical aluminum and boron alkoxides include their methoxides, ethoxides, isopropoxides, n-pentoxides and related alkoxides of aluminum and boron. Suitably at least 0.1 molar part, and more usually 0.1 to 1.0 molar parts, of the alkoxide to one molar part of the sulfurated aldehyde are utilized. Desulfuration reactions effected in the presence of such metal alkoxides are effected under substantially anhydrous conditions.

Another effective group of desulfurating agents that can be employed are certain phosphorus-containing compounds. Such phosphorus-containing desulfurating agents are substituted phosphorus and phosphonous acids having the general formulas

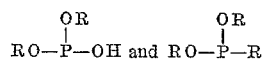

wherein R is a monovalent hydrocarbon group such as an alkyl radical, the alkyl radical desirably having 1 to 8 carbon atoms and preferably 1 to 4 carbon atoms, or an aryl radical such as phenyl. Typical phosphite and phosphonite desulfurating agents that can be employed include phenyl diisobutyl phosphonite, phenyl diphenyl phosphonite, phenyl diethyl phosphonite, isobutyl diisobutyl phosphonite, ethyl diethyl phosphonite, phenyl disitosteryl phosphonite, phenyl diamyl phosphonite, diethyl phosphite, diphenyl phosphite, di-n-butyl phosphite and related esters of phosphorus and phosphonous acids. At least a molar proportion of such esters is employed as the desulfurating agent for each molar proportion of the subject reaction product of the aldehyde and hydrogen sulfide. Stoichiometric excesses of the phosphite or phosphonite ester can be suitably employed. As the phosphite and phosphonite esters react with water, substantially anhydrous conditions are employed. Likewise, substantially inert organic solvents are usually employed such as the non-polar solvents, and especially conventional non-polar, substantially inert, hydrocarbon solvents having 5 to 10 carbon atoms such as benzene, toluene, cyclohexane, petroleum ethers, and other solvents that are substantially non-reactive to, or inert to, the described phosphite and phosphonite esters. However, the phosphite and phosphonite esters can be employed as desulfuration agents in the absence of a solvent if desired. The phosphorus-containing desulfurating agents described above were discovered by co-worker Stern after our discovery of the present process and are disclosed in U.S. Patent 2,990,430.

The resulting highly unsaturated reaction product can be worked-up or purified by conventional methods, typical of such methods being solvent extraction, chromatographic adsorption, and crystallization, or combinations thereof.

A typical highly unsaturated reaction product is β-carotene. The β-carotene resulting from such a synthesis is a mixture of geometrical isomers that can be utilized as coloring and vitamin A-active materials as such, or this isomeric mixture can be converted to the all-trans isomer by conventional methods. A typical method for converting or isomerizing the isomeric β-carotene product to all-trans β-carotene is to dissolve the isomeric mixture in a solvent such as petroleum ether (B.P. 30–60° C.), add a small amount of iodine such as 20 mg. of iodine per gram of β-carotene concentrate, stir the resulting mixture at room temperature for about an hour, remove the iodine, add ethyl formate, cool the mixture to about −20° C. and thereby crystallize therefrom all-trans β-carotene. The resulting filtrate can again be isomerized with iodine, and more all-trans β-carotene separated out.

The invention is further illustrated by the following examples of preferred embodiments thereof. Unless otherwise indicated, the ultraviolet data in the examples was determined in ethanol.

Example I

A 10 g. sample of 2-cis,6-trans vitamin A aldehyde having E(1%, 1 cm.)(377 mµ)=1250 in petroleum ether (B.P. 60–70° C.) was dissolved in 100 cc. of dry pyridine and saturated with hydrogen sulfide gas at −10° C. for four hours. The resulting reaction mixture was diluted with 300 cc. isopropyl ether and the ether solution washed twice with ice-cold dilute (5%) hydrochloric acid, once with saturated aqueous sodium bicarbonate solution and with water to neutrality. After drying over anhydrous sodium sulfate, the resulting ether solution was evaporated under vacuum at about 45° C. to leave 10.2 g. of a red colored oil. The red colored oil contained no unreacted vitamin A aldehyde as determined from its infrared absorption spectrum, had E(1%, 1 cm.)(274 mµ)=500 in petroleum ether (B.P. 60–70° C.) and its infrared absorption spectrum showed a strong band at 14.3 microns indicating a carbon-sulfur bond and a weak band at 10.3 microns indicating participation of one of the unsubstituted carbon-carbon double bonds in the reaction. On elemental analysis, 10.5% sulfur was found (theoretical 10.67%). The prepared substituted thiapyran had the following structure:

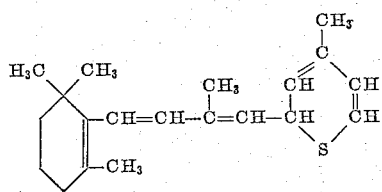

To illustrate the utility of the prepared substituted thiapyran, a 2 g. sample thereof was dissolved in 20 cc. of pyridine and 4 g. of freshly prepared zinc-amalgam was then added to this solution. Thereafter the resulting mixture was heated for 2.5 hours at 95° C. in a nitrogen atmosphere. The resulting reaction mixture was diluted with about 40 cc. of diethyl ether, filtered, and the filtrate washed successively with ice-cold dilute (5%) hydrochloric acid, saturated sodium carbonate solution, and then water to neutrality. The diethyl ether solution was then dried over anhydrous sodium sulfate and evaporated to yield 1.98 g. of a β-carotene concentrate having E(1%, 1 cm.)(448 mµ)=1250 in petroleum ether (B.P. 60–70° C.).

Example II

A. A slow stream of hydrogen sulfide was bubbled through a solution of 1.5 g. of 5-phenyl-3-methyl-2,4-pentadienal in 20 cc. of pyridine at −10° C. for 5.5 hours. The resulting reaction mixture was then diluted with diethyl ether and the ether solution was washed successively with ice-cold dilute (10%) sulfuric acid, N/2 potassium hydroxide and finally with water to neutrality. After drying the ether solution over anhydrous sodium sulfate and evaporating the ether solvent, 1.5 g. of residual oil was obtained. The oil reaction product contained no unreacted aldehyde as determined from its infrared absorption curve, it had E(1%, 1 cm.)(228 mµ)=468 in petroleum ether (B.P. 60–70° C.), its infrared absorption curve showed a strong band at 14.3 microns characteristic of a carbon-sulfur band, and 17.5% sulfur was found on its elemental analysis (theoretical 17%). The absence of an infrared absorption band at 10.3 microns, which band is characteristic of an unsubstituted trans carbon-carbon double bond, provided further evidence of a thiapyran structure in the product.

The prepared substituted thiapyran had the following structure:

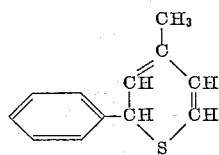

The prepared substituted thiapyran was readily converted into the corresponding symmetrical polyene hydrocarbon by desulfurating in the presence of a zinc-amalgam catalyst as described in Example I. The symmetrical polyene hydrocarbon had the following structure

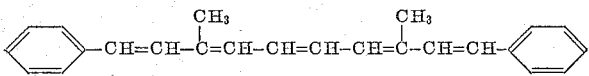

B. The 5-phenyl-3-methyl-2,4-pentadienal reactant was prepared from the corresponding carboxylic acid by esterifying the acid to form an ester, reducing the ester with a metal hydride to form the alcohol, and thereafter oxidizing the alcohol to the subject aldehyde reactant. A 10 g. portion of 5-phenyl-3-methyl-2,4-pentadienoic acid in 100 cc. of methyl ethyl ketone was combined with 30 g. of methyl iodide and 8 g. of potassium carbonate. The resulting mixture was refluxed 2 hours to yield 10.6 g. of the methyl ester of 5-phenyl-3-methyl-2,4-pentadienoic acid. A .0525 mole portion of the methyl ester was treated with a .057 mole portion of lithium aluminum hydride in 175 cc. of diethyl ether at 0° C. for 10 minutes to yield 8.6 g. of 5-phenyl-3-methyl-2,4-pentadienol. A .032 mole portion of the resulting alcohol was oxidized to the corresponding aldehyde by treating the alcohol with 82.5 g. of manganese dioxide in 82.5 cc. of diethyl ether at room temperature for 20 hours. The resulting 5-phenyl-3-methyl-2,4-pentadienal had E(1%, 1 cm.)(321 mµ)=1445 in ethanol.

Example III

A. Pseudo-vitamin A aldehyde having the formula

is readily converted into a substituted thiapyran which can be desulfurated by the method described in Example I to form the symmetrical polyene hydrocarbon lycopene. A solution of 1.5 g. of pseudo-vitamin A aldehyde in 20 cc. of pyridine reacted and worked up as described in Example II results in a substituted thiapyran having the structure

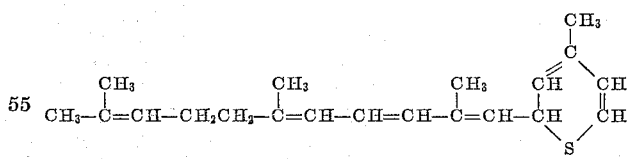

B. The pseudo-vitamin A aldehyde reactant is prepared from pseudo-ionone. A 30 g. portion of pseudo-ionone was combined with 23 g. of propargyl bromide and 4.7 g. of magnesium in 130 cc. of diethyl ether and the reaction mixture refluxed for 50 minutes. To the resulting reaction mixture was added a 57 cc. diethyl ether solution containing 18.9 g. of ethyl magnesium bromide over a 35-minute period, the resulting mixture refluxed 3 hours, held for about 14 hours at room temperature and then cooled to 0° C. To the resulting cooled mixture, 19.4 g. of 4,4-dimethoxy-2-butanone was added over a one-hour period, and thereafter the reaction mixture was stirred at room temperature for 4 hours. The resulting reaction mixture was then treated with about 100 cc. of 2 N sulfuric acid at 0° C., the reaction mixture extracted with diethyl ether, and the ether fraction washed with 2 N sulfuric acid and then with water. A 10 g. portion of the resulting acetylenic diol acetal compound was hydrogenated in the presence of 5% palladium on charcoal and .5 g. of quinoline in 100 cc. of methyl ethyl ketone to reduce the acetylenic bond to an olefinic bond. A 6.5 g. portion of the resulting reduced compound was refluxed in 90 cc. of methyl ethyl ketone with .7 g. of pyridine and .75 cc. of concentrated hydrochloric acid. The resulting pseudo-vitamin A aldehyde reaction product was taken up in diethyl ether, washed with 5% sulfuric acid and then with water. The pseudo-vitamin A aldehyde reaction product was further purified by chromatography on sodium aluminum silicate to yield a product having E(1%, 1 cm.)(397 m$\mu$)=1045 in ethanol.

*Example IV*

A. A 1.8 g. portion of 3-methyl-5-(3,4-methylenedioxyphenyl)-2,4-pentadienal in 19 ml. of pyridine was reacted with H$_2$S gas (a slow stream) at —10° C. for 6 hours. The reaction mixture was then diluted with diethyl ether and the ether solution was washed successively with ice-cold dilute (10%) sulfuric acid, N/2 potassium hydroxide and finally with water to neutrality. After drying the ether solution over anhydrous sodium sulfate and evaporating the ether solvent, 2 grams of an oil was obtained which was further purified by chromatography from benzene solution on an aluminum silicate adsorbent. A weakly adsorbed orange zone passed down the adsorption column on development with benzene to give a 0.85 g. filtrate fraction which contained no unreacted aldehyde as determined from its infrared absorption curve, it had E(1%, 1 cm.)(225 m$\mu$)=468 in petroleum ether (B.P. 60–70° C.), its infrared absorption curve showed a strong band at 14.3 microns characteristic of a carbon-sulfur bond, and 13.8% sulfur was found on its elemental analysis (theoretical 13.8%). The absence of an infrared absorption band at 10.3 microns, which band is characteristic of an unsubstituted trans carbon-carbon double bond, provided further evidence of a thiapyran structure in the product. The prepared substituted thiapyran had the following structure:

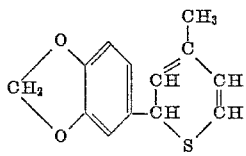

A 0.51 g. sample of the prepared thiapyran in 5 cc. of pyridine was heated on a steam bath with 1.0 g. of zinc-amalgam for two hours and thereafter worked up as was the β-carotene in Example I to yield 0.37 g. of a reddish solid symmetrical polyene concentrate having E(1%, 1 cm.)(412 m$\mu$)=728 in petroleum ether (B.P. 60–70° C.). Crystallization of the resulting product from benzene gave an orange solid melting at 198–200° C. and having E(1%, 1 cm.)(414 m$\mu$)=1720. The symmetrical polyene product had the formula

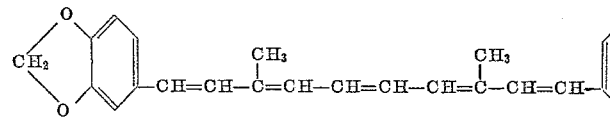

B. The 3-methyl-5-(3,4-methylenedioxyphenyl)-2,4-pentadienal was prepared from the corresponding carboxylic acid by esterifying the acid to form an ester, reducing the ester with a metal hydride to form the alcohol, and thereafter oxidizing the alcohol to the subject aldehyde reactant. A 12.5 g. portion of 3-methyl-5-(3,4-methylenedioxyphenyl)-2,4-pentadienoic acid in 100 cc. of methyl ethyl ketone was combined with 30 g. of methyl iodide and 8 g. of potassium carbonate. The resulting mixture was refluxed 2 hours to yield 11.2 g. of the methyl ester of the starting carboxylic acid material. A .0244 mole portion of the methyl ester was treated with a .033 mole portion of lithium aluminum hydride in 100 cc. of diethyl ether at 0° C. for 10 minutes to yield 5.33 g. of the alcohol, 3-methyl-5-(3,4-methylenedioxyphenyl)-2,4-pentadienol. A .0091 mole portion of the resulting alcohol was oxidized to the corresponding aldehyde by treating the alcohol with 30 g. of manganese dioxide in 90 cc. of diethyl ether at room temperature for 20 hours. The resulting 3-methyl-5-(3,4-methylenedioxyphenyl)-2,4-pentadienal had E(1%, 1 cm.)(348 m$\mu$)=843 in ethanol.

*Example V*

A. A slow stream of hydrogen sulfide was bubbled through a solution of 2.0 g. of 3-methyl-7-phenyl-2,4,6-heptatrienal in 20 cc. of pyridine at —10° C. for 6 hours. The resulting reaction mixture was diluted with diethyl ether and the ether solution washed successively with ice-cold dilute (10%) sulfuric acid, N/2 potassium hydroxide and finally with water to neutrality. The resulting ether solution was dried over anhydrous sodium sulfate and the solvent evaporated to give 2.0 g. of residual oil. Purification of the oil by chromatography on an aluminum silicate adsorbent gave 1.4 g. of a substituted thiapyran product having E(1%, 1 cm.)(260 m$\mu$)=778 in petroleum ether (B.P. 60–70° C.). The product showed a strong band at 14.3 microns in its infrared spectrum characteristic of a carbon-sulfur bond, contained 14.9% sulfur as determined by elemental analysis (theoretical 14.8%) and contained no unreacted aldehyde as determined from its infrared absorption spectrum. Further, the infrared absorption spectrum of the product showed a weak absorption band at 10.3 microns. The prepared substituted thiapyran had the following structure:

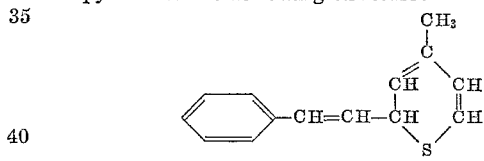

A 0.5 g. sample of the prepared thiapyran in 5 cc. of pyridine was heated in the presence of 1.0 g. of zinc-amalgam at 95° C. for 2 hours. After diluting the reaction mixture with diethyl ether and filtering, the filtrate was washed successively with ice-cold dilute (10%) sulfuric acid, N/2 potassium hydroxide, and then with water to neutrality. The resulting solution was then dried over sodium sulfate and the solvent evaporated to yield 0.38 g. of a red solid having E(1%, 1 cm.)(429 m$\mu$)=642 in petroleum ether (B.P. 60–70° C.). Purification of the resulting reaction product by crystallization gave orange crystals of a symmetrical conjugated polyene having the formula

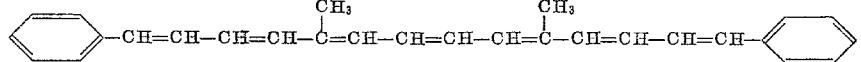

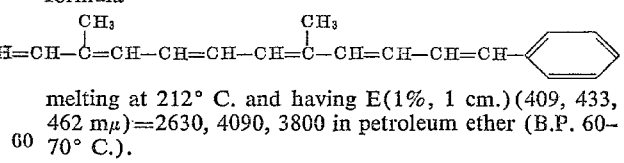

melting at 212° C. and having E(1%, 1 cm.)(409, 433, 462 m$\mu$)=2630, 4090, 3800 in petroleum ether (B.P. 60–70° C.).

B. The 3-methyl-7-phenyl-2,4,6-heptatrienal was prepared from the corresponding carboxylic acid by esterifying the acid to form an ester, reducing the ester to form the alcohol, and thereafter oxidizing the alcohol to the subject aldehyde reactant. A 6 g. portion of 3-methyl-7-phenyl-2,4,6-heptatrienoic acid in about 100 cc. of methyl ethyl ketone was combined with 20 g. of methyl iodide and 5.5 g. of potassium carbonate. The resulting mixture was refluxed for 2 hours to yield 7 g. of the methyl ester of 3-methyl-7-phenyl-2,4,6-heptatrienoic acid. A .0307 mole portion of the methyl ester was treated with a .0370 mole portion of lithium aluminum hydride in 100 cc. of diethyl ether at 0° C. for 10 minutes to yield 6.1 g. of 3-methyl-7-phenyl-2,4,6-heptatrienol. A .015 mole portion of the resulting alcohol was oxidized to the corresponding aldehyde by treating the alcohol with 45 g. of manganese dioxide in 45 cc. of diethyl ether at room temperature for 20 hours. The resulting 3-methyl-7-phenyl-2,4,6-heptatrienal had E(1%, 1 cm.)(351 mµ)=1735 in ethanol.

*Example VI*

A 5.95 g. sample of trans β-ionylidene acetaldehyde having E(1%, 1 cm.)(325 mµ)=672 in petroleum ether (B.P. 60–70° C.) dissolved in 60 cc. of pyridine was treated with a slow stream of hydrogen sulfide gas at −10° C. for 6 hours. The resulting reaction mixture was worked up as was the substituted thiapyran described in Example I to give 6.7 g. of a viscous yellow oil which was further purified by chromatography from benzene solution on an aluminum silicate adsorbent to give 2.35 g. of a non-adsorbed fraction. The infrared absorption spectrum of the fractionated product indicated an absence of unreacted aldehyde, a strong band at 14.3 microns indicated a carbon-sulfur bond and the absence of a band at 10.3 microns indicated the absence of a trans unsubstituted carbon-carbon double bond. Elemental analysis of the product showed a 13.7% sulfur content (theoretical 13.7%). The prepared substituted thiapyran product had the following structure:

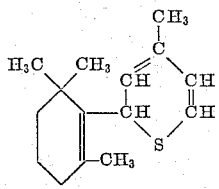

A 1.6 g. sample of the prepared thiapyran in 16 cc. of pyridine was heated on a steam bath with 3.2 g. of zinc-amalgam under a nitrogen atmosphere for 2 hours. The resulting reaction mixture was worked up in the same way as the β-carotene concentrate described in Example I to give 1.57 g. of a concentrate of symmetrical polyene hydrocarbon having E(1%, 1 cm.)(368 mµ)=374 in petroleum ether (B.P. 60–70° C.) and having the formula

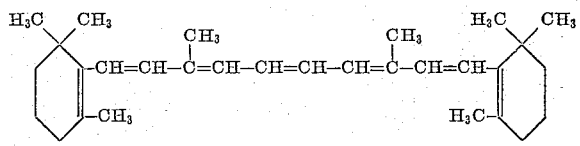

*Example VII*

To a cold (−10° C.) 100 cc. portion of aniline saturated with hydrogen sulfide was added dropwise over a period of 30 minutes a 10.0 g. portion of mixed isomers of vitamin A aldehyde having E(1%, 1 cm.)(371 mµ)=751 in petroleum ether (B.P. 60–70° C.) dissolved in 10 cc. of pyridine. The isomeric vitamin A aldehyde contained the 2,6-trans,trans isomer, the 2,6-cis,cis isomer, the 2-cis,6-trans isomer and the 2-trans,6-cis isomer. A slow stream of gaseous hydrogen sulfide was bubbled through the reaction mixture for 5 hours at −10° C. The resulting reaction product was then diluted with 500 cc. of diethyl ether, washed twice with ice-cold dilute (5%) hydrochloric acid, once with saturated sodium bicarbonate solution and then with water to neutrality. The resulting ether solution was then dried over anhydrous sodium sulfate. The ether was evaporated under vacuum to yield 10.78 g. of a red oil having E(1%, 1 cm.)(275 mµ)=404 in petroleum ether (B.P. 60–70° C.). The infrared absorption curve of the product showed an absence of unreacted aldehyde, the presence of a strong band at 14.3 microns and a weak band at 10.3 microns. The product was a substituted thiapyran having the following structure:

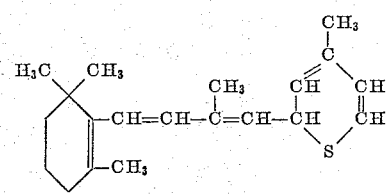

The prepared substituted thiapyran was readily converted to β-carotene by the method described in Example I.

*Example VIII*

A. A 1.0 gram portion of 3-methoxyvitamin A aldehyde having E(1%, 1 cm.)(372 mµ)=1194 and a formula of

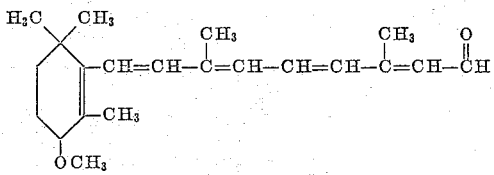

was dissolved in 2 cc. of dry pyridine and slowly added with stirring to 10 cc. of aniline at −10° C. which previously had been saturated with hydrogen sulfide. The resulting mixture was stirred for an additional 2.5 hours at −10° C. while hydrogen sulfide was bubbled therethrough. After diluting the resulting reaction mixture with 100 cc. of diethyl ether, the ether solution was washed successively with ice-cold 10% hydrochloric acid, 0.5 N potassium hydroxide, and finally with water. The washed ether solution was then dried over anhydrous sodium sulfate, filtered, and the solvent evaporated to yield an 820 mg. residue which was purified by chromatographing a petroleum ether (B.P. 60–70° C.) solution of it on a column of magnesia silica gel adsorbent ("Florisil"). A weakly adsorbed yellow zone was eluted from the column with diethyl ether to give a substituted thiapyran concentrate having E(1%, 1 cm.)(272 mµ)=536. The substituted thiapyran had the following structure:

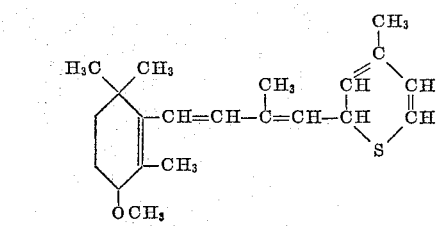

B. The prepared substituted thiapyran can be readily converted to the useful poultry feed pigmenter, isozeaxanthin dimethyl ether (4,4′-dimethoxy-β-carotene). A 494 mg. portion of the prepared substituted thiapyran in about 10 ml. of pyridine was mixed with 1 g. of freshly prepared zinc amalgam at a temperature of 70° C. in an atmosphere of carbon dioxide for 5 hours. The resulting reaction mixture was then diluted with diethyl ether and the ether solution washed successively with ice cold 10% hydrochloric acid, 0.5 N potassium hydroxide and water. After drying and evaporating the solvent, a residual concentrate of isozeaxanthin dimethyl ether was obtained having E(1%, 1 cm.)(447 mµ)=1402. The infrared absorption spectrum of the carotenoid product showed the presence of the methoxy group (9.25µ).

C. The 3-methoxyvitamin A aldehyde reactant was prepared as follows: Five grams of crystalline all-trans vitamin A aldehyde was dissolved in a mixture of 30 ml. chloroform and 2 ml. anhydrous methanol. This solution was cooled to 0° C. and treated with 3.15 g. N-bromosuccinimide in a mixture of 150 ml. of chloroform and 4 ml. of methanol also at 0° C. The solution was allowed to stand at 0° for 5 min., and then treated with 7.5 g. N-ethyl morpholine. The solution was allowed to warm to room temperature over a 3 hr. period, diluted with 300 ml. diethyl ether and washed successively with cold 10% HCl, 0.5 N KOH and water. The solution was dried with anhydrous sodium sulfate and evaporated. The yield of product was 6.04 g. This material was dissolved in 100 ml. of petroleum ether (boiling 30–60° C.), and chromatographed on 350 g. sodium aluminum silicate adsorbent ("Doucil"). A weakly adsorbed orange zone near the bottom of the column gave, on elution with diethyl ether, 2.0 g. of unreacted vitamin A aldehyde, E(1%, 1 cm.)(378 mµ)=1245. A more strongly adsorbed yellow zone was eluted to give 3.04 g. of a 3-methoxyvitamin A aldehyde concentrate with E(1%, 1 cm.) (372 mµ)=1194.

*Example IX*

A. A 10 g. sample of 3-lauroxyvitamin A aldehyde in 100 cc. of dry pyridine reacted with hydrogen sulfide as described in Example I yields a substituted thiapyran having the structure

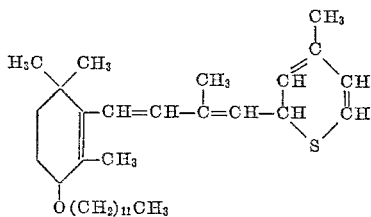

This substituted thiapyran is readily converted to the symmetrical carotenoid, 4,4′-dilauroxy-β-carotene, in the presence of a zinc-amalgam catalyst by the method described in Example I.

B. The 3-lauroxyvitamin A aldehyde reactant having the structure

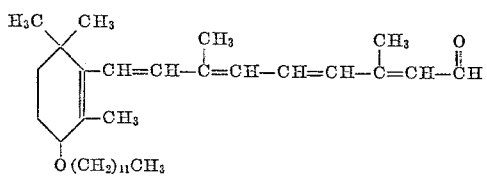

is prepared as follows. To a solution of 5 g. of all-trans vitamin A aldehyde and 2 ml. of lauryl alcohol in 30 ml. of chloroform at 0° C. was added a cold (0° C.) solution consisting of 3.15 g. of N-bromosuccinimide and 4 ml. of lauryl alcohol in 150 ml. of chloroform. After 6 minutes, 7.5 g. of N-ethyl morpholine was added to the reaction mixture and the solution allowed to warm to room temperature over a period of 3 hours. After diluting with 100 ml. of diethyl ether, the resulting solution was washed successively with 10% sulfuric acid, 0.5 N potassium hydroxide, and finally with water, and thereafter dried over anhydrous sodium sulfate. The residue obtained after evaporating the solvent was chromatographed on a column of 500 g. of sodium aluminum silicate adsorbent ("Doucil") to give 4.7 g. of a strongly adsorbed fraction of 3-lauroxyvitamin A aldehyde having E(1%, 1 cm.)(275 mµ)=733. A second similar chromatographing raised the E(1%, 1 cm.) value to 887. The infrared absorption curve of the prepared sample showed the presence of the carbonyl and ether groups.

*Example X*

A 2 g. portion of 3-acetoxyvitamin A aldehyde having E(1%, 1 cm.)(372 mµ)=1156 in 4 cc. of dry pyridine was added dropwise with stirring to 20 cc. of aniline which had been previously saturated with hydrogen sulfide at −10° C. The resulting mixture was stirred at −10° C. for 3 hours with the continuous passage of hydrogen sulfide through the reaction mixture. The resulting reaction mixture was then taken up in diethyl ether and the resulting ether solution washed successively with ice cold 10% hydrochloric acid, .5 N potassium hydroxide and water. After drying over anhydrous sodium sulfate, filtering and evaporating the solvent, there was obtained a 1.75 g. concentrate of a substituted thiapyran having the structure

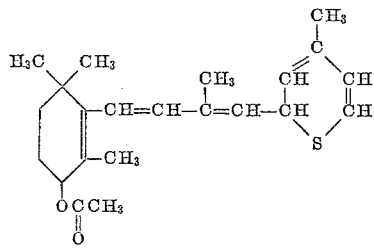

This substituted thiapyran is readily converted to the symmetrical carotenoid, 4,4′-diacetoxy-β-carotene, in the presence of a zinc-amalgam catalyst by the method described in Example I. The 3-actoxyvitamin A aldehyde reactant is described in Dutch Patent No. 25,284 and has the structure

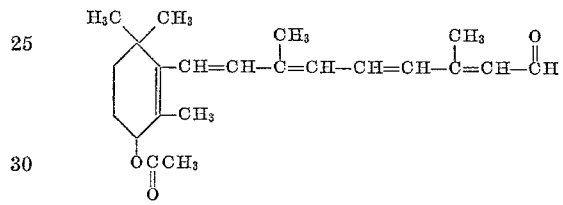

If 4-acetoxylvitamin A aldehyde is substituted for the 3-acetoxyvitamin A aldehyde reactant, a substituted thiapyran having the following structure results:

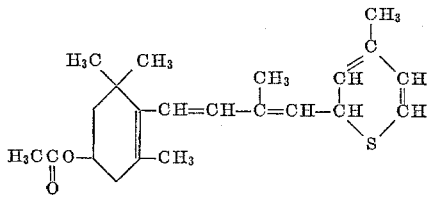

*Example XI*

Hydrogen sulfide was bubbled through 10 cc. of aniline at −10° C. for 0.5 hour and then an ice cold solution composed of 700 mg. of 3-oxovitamin A aldehyde and 2 cc. of pyridine was added dropwise thereto. Passage of hydrogen sulfide through the reaction mixture was continued for 2.5 hours while the reaction mixture was maintained at −10° C. The reaction mixture was then taken up in diethyl ether and the resulting ether solution washed successively with ice cold 10% hydrochloric acid, saturated sodium bicarbonate solution and water. After drying the resulting washed ether solution over anhydrous sodium sulfate, the solvent was evaporated to yield 615 mg. of a substituted thiapyran concentrate as a glassy solid. The substituted thiapyran had the structure

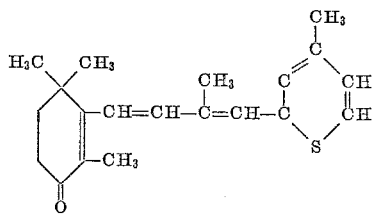

The 3-oxovitamin A aldehyde reactant is described in J. Chem. Soc., page 4909 (1957). The substituted thiapyran product of the reaction was dissolved in 6 cc. of pyridine and the solution heated in the presence of 1.2 g. of amalgamated zinc for about ten hours at about 95° C. in a nitrogen atmosphere. The resulting reaction mixture was then taken up in diethyl ether, filtered, and the filtrate washed successively with ice cold 5% hydrochloric acid, saturated sodium carbonate solution and water. After drying the resulting washed ether solution over anhydrous sodium sulfate, the solvent was evaporated to yield a 4,4'-dioxo-β-carotene concentrate having E(1%, 1 cm.)(460 mμ)=200. If 4-oxovitamin A aldehyde is substituted for the 3-oxovitamin A aldehyde reactant, a substituted thiapyran having the following structure results:

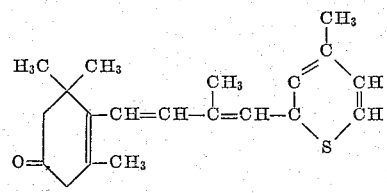

*Example XII*

A. A mixture of substituted thiapyrans was prepared from a mixture of oxygenated polyene aldehydes prepared as described in part "B" of this example having E(1%, 1 cm.)(373 mμ)=715 and consisting essentially of compounds indicated to be 4-methoxyvitamin A aldehyde and 4-methoxy-α-vitamin A aldehyde having the following structures:

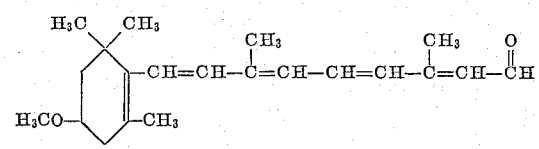

and

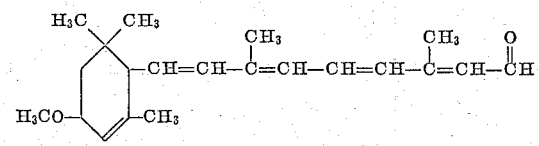

A 10 g. sample of this mixture of oxygenated aldehydes dissolved in 100 cc. of pyridine and reacted with hydrogen sulfide as described in Example 1 results in a mixture of substituted thiapyrans indicated to have the structures

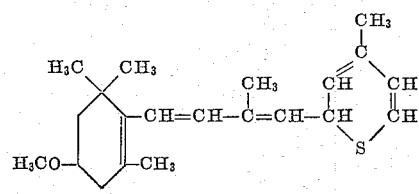

and

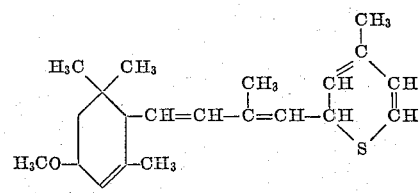

This mixture of substituted thiapyrans is readily converted to a mixture of 3,3'-dimethoxy-α-, β- and ε-carotenes in the presence of a zinc-amalgam catalyst by the method described in Example 1.

B. The mixture of oxygenated polyene aldehydes used to prepare the substituted thiapyrans of part "A" of this example were prepared as follows. To 19.2 g. of α-ionone in 140 ml. of carbon tetrachloride was added 18 g. of dibromoethylmethylhydantoin. The mixture was swirled and heated until a vigorous reaction occurred. When the reaction subsided, the mixture was refluxed 2 minutes, rapidly cooled to 15° C., and filtered from the solid ethylmethylhydantoin in the reaction mixture into a solution of 12.3 g. of anhydrous sodium acetate in 125 ml. of methanol. The ethylmethylhydantoin on the filter was washed with 50 ml. carbon tetrachloride, and 50 ml. more of methanol were added to the combined filtrate and washings, which were simmered 2.5 hours and let stand at room temperature overnight (about 18 hours). The resulting reaction product was then worked-up by water dilution and extraction with diethyl ether to give 24.8 g. of an oil which was chromatographed on alumina from petroleum ether (boiling 30–60° C.). The lower zone of the chromatographic column containing unreacted α-ionone was washed through the column and discarded, and the main zone of the chromatographic column eluted to give 18.8 g. of an oil having E(1%, 1 cm.)(225 mμ, 281 mμ)=458, 138 and a strong ether and weak acetate ester bands in its infrared spectrum. The resulting product was let stand at room temperature overnight (about 18 hours) in 100 ml. of .5 N potassium hydroxide in 90% ethanol. The resulting 16.7 g. of oil was chromatographed from petroleum ether (boiling 30–60° C.) on a 3.7 x 60 cm. sodium aluminum silicate ("Doucil") column. A lower yellow zone was washed through the column, giving 12.2 g. of an orange oil having E(1%, 1 cm.)(223 mμ, 287 mμ)=382, 230. The infrared spectrum of the orange oil showed the presence of a conjugated ketone at 5.95μ, a conjugated double bond at 6.18μ, a methoxy group at 9.11μ, and a trans-double bond at 10.17μ, confirming that the material was composed of methoxyionones. Based on the analysis, the prepared product was indicated to be a mixture of 4-methoxy-α-ionone and 4-methoxy-β-ionone. The resulting methoxyionones were then converted to the mixture of oxygenated polyene aldehydes used in the present process by the general method described in Humphlett and Burness U.S. Patent No. 2,676,990 for preparing vitamin A aldehyde from β-ionone as follows. A 10 g. portion of the prepared methoxyionones was reacted with 5.85 g. of propargyl bromide and 1.2 g. of magnesium turnings in about 35 ml. of diethyl ether. The reaction was effected by warming to gentle reflux with stirring for about 5 minutes, the heat removed and the reaction controlled with an ice bath to a gentle reflux for about 30 minutes. Thereafter heat was applied and the reaction mixture gently refluxed 30 minutes more. The resulting magnesium complex was decomposed with 5% sulfuric acid. The resulting propynyl carbinols were then converted to acetylenic diol acetals by condensing with 7.2 g. of 4,4'-dimethoxy-2-butanone in the presence of ethylmagnesium bromide in about 100 ml. of diethyl ether by refluxing for about 5 hours, and the resulting complex decomposed with 5% sulfuric acid to produce acetylenic diol acetals. The acetylenic diol acetals were purified by chromatographing on a sodium alumina silicate adsorbent ("Doucil"), to yield an 8.2 g. purified fraction which was selectively reduced to olefinic diol acetals with hydrogen over .82 g. of 5% palladium catalyst on carbon in 82 cc. of butanone-2 containing .41 ml. of quinoline. The reduction was effected in about 20 minutes at about room temperature. After removal of the hydrogenation catalyst by filtration, the resulting olefinic diol acetals were refluxed in the presence of .62 ml. of quinoline and .72 ml. of hydrochloric acid in about 50 ml. of methyl ethyl ketone. The resulting mixture of oxygenated polyenealdehydes having E(1%, 1 cm.)(373 mμ)=715 are reacted with hydrogen sulfide to prepare the mixture of substituted thiapyrans as described above in part "A" of this example.

*Example XIII*

The oxygenated carotenoids prepared from the substituted thiapyrans described in Examples VIII to XII have utility as additives to poultry feed to produce pigmentation of broilers and egg yolks. These oxygenated carotenoids, when employed in the feed formulation described below at levels of 36 mg. per pound of feed, and fed to chickens ad libitum for one week following a depletion period of 3 weeks on a pigment-free diet, impart a light yellow to orangish figmentation to the skin of the chickens. Chickens fed on the same diet in the absence of such oxygenated carotenoids have a pale skin. The feed formulation minus the described additives is as follows:

| Ingredients: | Amount, percent |
|---|---|
| Ground white hominy | 71.795 |
| Soybean meal | 15.64 |
| Meat scrap | 5.0 |
| Calcium carbonate | 4.0 |
| Molasses | 2.0 |
| Dicalcium phosphate | 1.0 |
| Iodized salt | .375 |
| Vitamin A and D feeding oil | .125 |
| Vitamin concentrate (water soluble) | .04 |
| Manganese sulfate | .025 |
| | 100.000 |

| | |
|---|---|
| Potassium iodide g./ton | 5.5 |
| D-activated animal sterol do | 6.7 |

Examples XIV to XXI below illustrate the preparation of β-carotene from vitamin A aldehyde.

*Example XIV*

A. A 4.00 g. sample of crystalline 2,6-trans,trans vitamin A aldehyde was dissolved in 40 cc. of pyridine and saturated with hydrogen sulfide gas at −10° C. for five hours. The reaction mixture was diluted with 120 cc. of isopropyl ether and the ether extract was washed twice with ice-cold dilute (5%) hydrochloric acid, once with saturated sodium bicarbonate solution and then with water to neutrality. After drying over anhydrous sodium sulfate, the ether extract was evaporated under vacuum at about 45° C. leaving 4.08 g. of a red oil. The reaction product contained no unreacted vitamin A aldehyde as determined by infrared absorption spectrum analysis and had E(1%, 1 cm.)(375 mµ)=495 in petroleum ether (B.P. 60–70° C.).

B. A 0.50 g. sample of the product from Example XIV–A was dissolved in 5 cc. of pyridine and mixed with 1 g. of zinc-amalgam catalyst prepared as described in Example XIV–D below. The mixture was then heated on a steam bath, protected from light and under a nitrogen atmosphere, for seven hours. After cooling to room temperature, the reaction mixture was filtered through a filter-aid ("Celite"), to remove metal particles, and the resulting filtrate was diluted with 10 cc. of diethyl ether. The ether solution was washed three times with ice-cold dilute (5%) hydrochloric acid, once with a saturated sodium carbonate solution, and then with water to neutrality. After drying over anhydrous sodium sulfate, the solvent was evaporated in vacuo at about 45° C. leaving 0.48 g. of a viscous dark residue having E(1%, 1 cm.) (448mµ)=860 in petroleum ether (B.P. 60–70° C.). Isomerization of this reaction product with iodine (20 mg. of iodine per gram of product for one hour at room temperature in petroleum ether boiling 30–60° C.) and crystallization of the resulting isomerized mixture from ethyl formate at −20° C., gave all-trans β-carotene having M.P. 180–180.5° C. and E(1%, 1 cm.)(450 mµ)=2450 in petroleum ether (B.P. 60–70° C.).

C. Further isolation and characterization of thio-intermediate: A 2.14 g. sample of the product from Example XIV–A was dissolved in 20 cc. of petroleum ether (B.P. 60–70° C.) and adsorbed on 110 g. of magnesium silicate adsorbent (50–100 mesh) in a column (1¼" x 15"). The chromatogram was developed with about 375 cc. of petroleum ether (B.P. 60–70° C.). A 0.97 g. weakly adsorbed fraction which was eluted with diethyl ether from the lower one-third of the column had E(1%, 1 cm.)(274 mµ)=533 in petroleum ether (B.P. 60–70° C.). This ultraviolet absorption was unchanged by additional chromatography. Elemental analysis and molecular weight determination (311, cryoscopic method in benzene) indicated the composition $C_{20}H_{28}S$. The infrared spectrum of the product showed a strong characteristic C—S band at 14.3µ. The thio-intermediate is deemed to have the structure

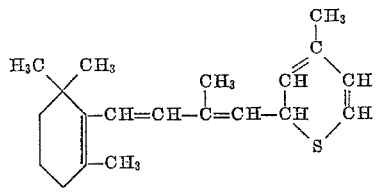

D. Preparation of zinc-amalgam desulfuration catalyst: To a mixture of 50 g. of zinc dust and 50 cc. of water was added a solution containing 2.5 cc. of conc. hydrochloric acid, 75 cc. of water and 5.0 g. of mercuric chloride. The mixture was shaken for about five minutes, allowed to stand at room temperature for 15 minutes, and the amalgamated zinc separated by filtration. After washing thoroughly with distilled water, the zinc-amalgam was dried under vacuum and utilized as the desulfuration catalyst as described in Example XIV–B above.

*Example XV*

A. To 20 cc. of cold (−10° C.) aniline saturated with hydrogen sulfide was slowly added dropwise over a period of 15 minutes a solution of 2.0 g. of 2,6-trans,trans vitamin A aldehyde in 3 cc. of pyridine while a slow stream of hydrogen sulfide was bubbled through the reaction mixture. This was continued for 4.5 hours at −10° C. and the reaction mixture then diluted with 120 cc. of diethyl ether. After washing the ether solution twice with ice-cold, dilute (5%) hydrochloric acid, once with a saturated sodium bicarbonate solution, and finally with water, it was dried over anhydrous sodium sulfate, filtered, and evaporated under vacuum to yield the thio-intermediate consisting of a 2.0 g. of a red oil having E(1%, 1 cm.)(275 mµ)=523 in petroleum ether (B.P. 60–70° C.). The product contained no unreacted vitamin A aldehyde as determined from its infrared absorption spectrum.

B. A 1.5 g. sample of the product from Example XV–A was dissolved in 15 cc. of pyridine, mixed with 3.0 g. of freshly prepared amalgamated zinc which was prepared as described in Example XIV–D, and then heated for three hours at 90° C. under nitrogen and protected from light. After cooling, the reaction mixture was filtered, diluted with diethyl ether, and the ether solution washed several times with ice-cold dilute (5%) hydrochloric acid, once with saturated sodium bicarbonate solution, and finally with water. After drying the ether solution over sodium sulfate, the solvent was removed under vacuum at 35° C. to yield a 1.48 g. concentrate of β-carotene having E(1%, 1 cm.)(447 mµ)=1185 in petroleum ether (B.P. 60–70° C.).

*Example XVI*

A. A 10.00 g. sample of crystalline 2-cis,6-trans vitamin A aldehyde was dissolved in 100 cc. of dry pyridine and saturated with hydrogen sulfide gas at −10° C. for about 5 hours. The reaction mixture was diluted with 300 cc. of isopropyl ether and washed twice with ice-cold dilute (5%) hydrochloric acid, once with saturated sodium bicarbonate solution and then with water to neutrality. After drying over anhydrous sodium sulfate, the ether phase was evaporated under vacuum at 40–45° C. The resulting 10.44 g. residue was a reddish oil having E(1%, 1 cm.)(274 mµ)=500 in petroleum ether (B.P. 60–70° C.), contained no unreacted vitamin A aldehyde as determined by infrared absorption spectrum analysis and its elemental analysis indicated the composition, $C_{20}H_{28}S$.

B. A 2.00 g. sample of the product from Example XVI–A was dissolved in 20 cc. of pyridine and mixed with 4.0 g. of zinc-amalgam prepared as described in Example XIV–D. The mixture was heated on a steam bath, protected from light and under a nitrogen atmosphere for 2½ hours. After cooling to room temperature, the reaction mixture was filtered through a filter aid ("Celite") to remove metal particles and the filtrate was diluted with 40 cc. of diethyl ether. The ether phase was washed three times with ice-cold dilute (5%) hydrochloric acid, once with a saturated sodium carbonate solution, and with water to neutrality. After drying over anhydrous sodium sulfate, the solvent was evaporated under vacuum leaving 1.98 g. of a violet, solid β-carotene concentrate having E(1%, 1 cm.)(448 mμ)=1250 in petroleum ether (B.P. 60–70° C.). Isomerization of this reaction product with iodine (20 mg. of iodine per gram of product at room temperature for one hour in petroleum ether boiling 30–60° C.) and crystallization of the isomerate from ethyl formate at −20° C., gave all-trans β-carotene, M.P. 180–180.5° C. E(1%, 1 cm.) (450 mμ)=2450 in petroleum ether (B.P. 60–70° C.).

*Example XVII*

The vitamin A aldehyde-hydrogen sulfide reaction product prepared according to the process described in Example XVI–A was desulfurated to β-carotene as described in Examples XVII–A to E below.

A. A 1.20 g. sample of the vitamin A aldehyde-hydrogen sulfide reaction product prepared as in Example XVI–A was dissolved in 12 cc. of dry pyridine and mixed with 2.40 g. of zinc dust. The mixture was heated on a steam bath and protected from light and air for 2¼ hours. After cooling to room temperature, the zinc was separated by filtration and the filtrate diluted with 75 cc. of isopropyl ether. The ether phase was washed several times with ice-cold dilute (5%) hydrochloric acid, once with saturated sodium bicarbonate solution, and then with water to neutrality. After drying over anhydrous sodium sulfate, the ether was evaporated in vacuo at about 45° C. leaving a 1.18 g. solid β-carotene concentrate having E(1%, 1 cm.)(447 mμ)=808 in petroleum ether (B.P. 60–70° C.).

B. A desulfuration reaction was run as in Example XVII–A with the exception that 2.0 g. of copper powder was added to the reaction mixture in lieu of the zinc dust. After four hours, the reaction mixture was filtered and the product isolated as in Example XVII–A. The resulting β-carotene concentrate was a semi-solid oil having E(1%, 1 cm.)(447 mμ)=612 in petroleum ether (B.P. 60–70° C.).

C. A 1.00 g. sample of the vitamin A aldehyde-hydrogen sulfide reaction product prepared as in Example XVI–A was dissolved in 10 cc. of dry pyridine and mixed with 2.0 g. of freshly precipitated copper powder. The mixture was heated on a steam bath and protected from light and air for 2¼ hours. The copper metal was removed by filtration and the mother liquor diluted with 10 cc. of diethyl ether. The β-carotene concentrate isolated as in Example XVII–A weighed 1.01 g. and had E(1%, 1 cm.)(447 mμ)=840 in petroleum ether (B.P. 60–70° C.).

D. A 2.00 g. sample of the vitamin A aldehyde-hydrogen sulfide reaction product prepared as in Example XVI–A was dissolved in 20 cc. of dry benzene and mixed with 4.00 g. of zinc-amalgam prepared as described in Example XIV–D. The mixture was heated on a steam bath, protected from light, under a nitrogen atmosphere for five hours. The reaction mixture was worked-up as in Example XVII–A giving a 1.88 g. β-carotene concentrate having E(1%, 1 cm.)(447 mμ)=727 in petroleum ether (B.P. 60–70° C.).

E. A 0.30 g. sample of the vitamin A aldehyde-hydrogen sulfide reaction product prepared as in Example XVI–A, was dissolved in 3 cc. of dry pyridine and heated on a steam bath, protected from light, under a nitrogen atmosphere in the absence of a catalyst material. After 17 hours the reaction mixture was cooled, diluted with 9 cc. of diethyl ether and worked-up as in Example XVII– A. A .30 g. sample of a dark colored solid β-carotene concentrate resulted having E(1%, 1 cm.)(446 mμ) =672 in petroleum ether (B.P. 60–70° C.).

*Example XVIII*

The thio-intermediate reaction product of 2-cis,6-trans vitamin A aldehyde and hydrogen sulfide was prepared according to the process described in Example XVI–A and desulfurated in the presence of several metal alkoxides to prepare β-carotene in Examples XVIII–A to D below:

A. A 0.50 g. sample of the thio-intermediate was dissolved in 7.5 cc. of isopropyl alcohol and treated with 0.17 g. of aluminum isopropoxide under substantially anhydrous conditions. The reactants were heated on a steam bath in a nitrogen atmosphere for three hours. After cooling to room temperature, the reaction mixture was diluted with 50 cc. of isopropyl ether. The ether phase was washed twice with ice-cold dilute (5%) hydrochloric acid, once with a saturated sodium bicarbonate solution and then with water to neutrality. After drying over anhydrous magnesium sulfate, the ether was evaporated under vacuum. The resulting reddish solid β-carotene concentrate (0.495 g.) had E(1%, 1 cm.)(448 mμ)=755 in petroleum ether (B.P. 60–70° C.).

B. A 0.50 g. sample of the thio-intermediate was dissolved in 2.5 cc. of pyridine and treated with 0.17 g. of aluminum isopropoxide dissolved in 2.5 cc. of benzene under substantially anhydrous conditions. The mixture was heated on a steam bath under nitrogen for 5¾ hours. The reaction product was isolated as described in Example XVIII–A. The resulting solid red β-carotene concentrate (0.50 g.) had E(1%, 1 cm.)(448 mμ)=835 in petroleum ether (B.P. 60–70° C.).

C. A 0.64 g. sample of the thio-intermediate was dissolved in 6.4 cc. of pyridine and treated with 0.115 g. of aluminum ethoxide dissolved in 6.4 g. of benzene under substantially anhydrous conditions. The reaction mixture was heated on a steam bath under nitrogen for five hours. The reaction product was isolated as described in Example XVIII–A. The resulting reddish β-carotene concentrate (0.62 g.) had E(1%, 1 cm.)(448 mμ)=805 in petroleum ether (B.P. 60–70° C.).

D. The thio-intermediate was similarly converted to β-carotene by the method described in Example XVIII–B except that 0.17 g. of isopropyl borate was used in lieu of the 0.17 g. of aluminum isopropoxide.

E. A 0.5 g. sample of the thio-intermediate prepared from 2,6-trans,trans vitamin A aldehyde in accordance with the method of Example XIV–A is converted to β-carotene by the method described in Example XVIII–C.

*Example XIX*

A. A solution of 6 g. of 2-cis,6-trans vitamin A aldehyde in 60 cc. of dry pyridine was cooled to −10° C. and treated at this temperature with hydrogen sulfide for five hours. After de-gassing, the reaction product was diluted with diethyl ether and the ether extract washed successively with 10% sulfuric acid, saturated sodium bicarbonate and then water to neutrality. After drying over anhydrous sodium sulfate the solvent was evaporated to give the thio-intermediate as 5.7 g. of an orange oil having E(1%, 1 cm.)(275 mμ)=490 in petroleum ether (B.P. 60–70° C.).

B. A solution of 0.64 g. of the thio-intermediate of Example XIX–A in 6.4 cc. of benzene was combined with 2.5 cc. of phenyl diisobutyl phosphonite and refluxed on a steam bath under a nitrogen atmosphere for two hours under substantially anhydrous conditions. The solvent was evaporated to give a 3.2 g. concentrate of β-carotene dissolved in phosphorus-containing esters having E(1%, 1 cm.)(448 mμ)=225 in petroleum ether (B.P. 60–70° C.). This product was diluted with 15 cc. of methanol and chilled overnight at 5° C. The resulting precipitate was collected, washed with methanol and dried under vacuum at about 45° C. to give a 0.41 g. β-carotene concentrate having E(1%, 1 cm.)(448 mμ)=1520 in petroleum ether (B.P. 60–70° C.).

C. A solution of a 0.5 g. sample of the thio-intermediate prepared in Example XIX–A in 5 cc. of benzene was refluxed with 2.5 g. of isobutyl diisobutyl phosphonite as described in Example XIX–B. The solvent was evaporated to give a 3.0 g. concentrate of β-carotene having E(1%, 1 cm.)(447 mμ)=164 in petroleum ether (B.P. 60–70° C.).

D. A solution of a 0.5 g. sample of the thio-intermediate prepared as in Example XIX–A in 10 cc. of toluene was treated with 2.0 g. ethyl diethyl phosphonite as described in Example XIX–B. The solvent was evaporated to give a 2.5 g. concentrate of β-carotene having E(1%, 1 cm.)(446 mμ)=120 in petroleum ether (B.P. 60–70° C.).

E. A solution of a 0.5 g. sample of the thio-intermediate prepared as in Example XIX–A in 5 cc. of toluene was heated on a steam bath with 2.5 g. of diethyl phosphite as described in Example XIX–B. The solvent was evaporated to give a 3.0 g. concentrate of β-carotene having E(1%, 1 cm.)(445 mμ)=85 in petroleum ether (B.P. 60–70° C.).

F. A solution of a 1.0 g. sample of the thio-intermediate prepared as in Example XIX–A in 10 cc. of toluene was heated on a steam bath with 8 g. of phenyl disitosteryl phosphonite for sixteen hours in a nitrogen atmosphere. The solvent was evaporated to give a 9.0 g. concentrate of β-carotene having E(1%, 1 cm.)(445 mμ)=29 in petroleum ether (B.P. 60–70° C.).

G. A 0.64 g. sample of the thio-intermediate prepared from 2,6-trans,trans vitamin A aldehyde in accordance with the method of Example XIV–A is converted to β-carotene with 2.5 cc. of phenyl diisobutyl phosphonite by the method described in Example XIX–B.

*Example XX*

A. To a cold (–10° C.) 100 cc. portion of aniline saturated with hydrogen sulfide was added dropwise over a period of 30 minutes a 10.0 g. portion of mixed isomers of vitamin A aldehyde having E(1%, 1 cm.)(371 mμ)=751 in petroleum ether (B.P. 60–70° C.) dissolved in 10 cc. of pyridine. The isomeric vitamin A aldehyde contained the 2,6-trans,trans isomer, the 2,6-cis,cis isomer, the 2-cis,6-trans isomer and the 2-trans,6-cis isomer. A slow stream of gaseous hydrogen sulfide was bubbled through the reaction mixture for 5 hours at –10° C. The resulting reaction product was then diluted with 500 cc. of diethyl ether, washed twice with ice-cold dilute (5%) hydrochloric acid, once with a saturated sodium bicarbonate solution and then with water to neutrality. The resulting ether solution was then dried over anhydrous sodium sulfate. The ether was evaporated under vacuum to yield the thio-intermediate consisting of 10.78 g. of a red oil having E(1%, 1 cm.)(275 mμ)=404 in petroleum ether (B.P. 60–70° C.) and containing no unreacted vitamin A aldehyde as determined by infrared absorption spectrum analysis.

B. A 10.5 g. portion of the product of Example XX–A was dissolved in 105 cc. of dry pyridine, mixed with 21 g. of zinc-amalgam prepared as described in Example XIV–D, and heated for 4 hours at 95° C. under nitrogen and protected from light. After cooling to room temperature, the reaction mixture was filtered, the filtrate diluted with 350 cc. of diethyl ether, and the ether solution washed twice with ice-cold dilute (5%) hydrochloric acid, once with a saturated sodium bicarbonate solution and then with water to neutrality. After drying the resulting ether solution over anhydrous sodium sulfate, the ether was evaporated under vacuum at 35° C. to yield a 10.02 g. β-carotene concentrate as a dark red oil having E(1%, 1 cm.)(446 mμ)=510 in petroleum ether (B.P. 60–70° C.).

*Example XXI*

A 4.0 g. portion of 2,6-trans,trans vitamin A aldehyde was dissolved in 40 cc. of pyridine and the solution cooled to –10° C. Gaseous hydrogen sulfide was bubbled into the resulting solution for a period of 5 hours at –10° C. The resulting reaction mixture was warmed to room temperature and the hydrogen sulfide was removed by degassing the solution at 35° C. under vacuum. Without further working up, a 10 cc. portion of the resulting pyridine solution was mixed with 1.48 g. of zinc amalgam prepared as described in Example XIV–D and heated on a steam bath under a nitrogen atmosphere protected from light for 7 hours. The reaction mixture was then filtered and the filtrate diluted with 50 cc. of diethyl ether. The ether solution was washed twice with ice-cold dilute (5%) hydrochloric acid, once with a saturated sodium carbonate solution and then with water to neutrality. After drying over anhydrous sodium sulfate, the ether was removed under vacuum at 35° C. to yield 0.73 g. of β-carotene as a red solid having E(1%, 1 cm.)(447 mμ)=860 in petroleum ether (B.P. 60–70° C.).

*Example XXII*

A. A solution of 2.0 g. of 3-methyl-7-phenyl-2,4,6-heptatrienal in 20 cc. of dry pyridine was cooled to –10° C. and treated with hydrogen sulfide for five hours at this temperature. After de-gassing, the reaction product was diluted with diethyl ether and the resulting ether extract washed with water to neutrality. After drying over anhydrous sodium sulfate, the ether solvent was evaporated to give 2.0 g. of a sulfur-containing compound as a yellow oil having E(1%, 1 cm.)(259 mμ)=750 in petroleum ether (B.P. 60–70° C.).

B. A solution of a 0.48 g. portion of the sulfur-containing compound from Example XXII–A in 3 cc. of benzene was refluxed on a steam bath with 1.2 g. of phenyl diisobutyl phosphonite in 2 cc. of toluene for 2 hours under substantially anhydrous conditions. The solvent was evaporated to give a concentrate of a polyene of the structure

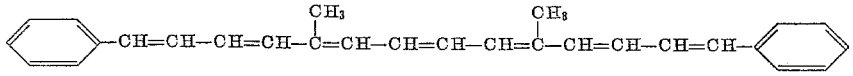

having E(1%, 1 cm.)(426 mμ)=231 in petroleum ether (B.P. 60–70° C.). A sample of the polyene worked up from methanol had E(1%, 1 cm.)(433 mμ)=4090 in petroleum ether (B.P. 60–70° C.).

C. The phenyl diisobutyl phosphonite desulfurating agent was prepared by slowly adding 3.58 g. of benzene phosphorous dichloride to 29.6 g. of isobutyl alcohol and 3.18 g. of pyridine in 330 cc. of diethyl ether. The resulting mixture was stirred for 1 hour under a nitrogen atmosphere. Thereafter the reaction mixture was filtered, solvent stripped off the resulting filtrate by distillation, the remaining residue distilled under a pressure of 7–8 mm. of mercury and fractions boiling at 80–85° C. having $n_D^{20}$ 1.4992 and boiling at 85–92° C. having $n_D^{20}$ 1.4986 were collected. These two fractions were combined and used as the desulfurating agent.

*Example XXIII*

Lycopene is prepared by reacting a solution of 2.0 g. of pseudo-vitamin A aldehyde, having the formula

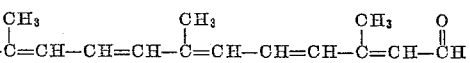

dissolved in 20 cc. of pyridine as described in Example XXII–A, by thereafter desulfurating a 0.48 g. portion of the resulting sulfur-containing reaction product in a toluene reaction medium with 1.2 g. of diphenyl phosphite as described in Example XXII–B.

The aldehydic reactant in the present process has the formula

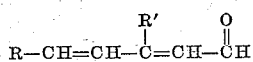

wherein R is a monovalent organic radical and wherein R' is an alkyl radical as described above. In aldehydic reactants wherein the R' is a hydrogen atom, no substituted thiapyran is formed. This further illustrates the unexpected nature of our invention. Examples XXIV and XXV below illustrate the inoperability of 7-phenyl-2,4,6-heptatrienal and desmethyl vitamin A aldehyde in the present process.

*Example XXIV*

A solution of 7-phenyl-2,4,6-heptatrienal (1.5 g.) in pyridine (10.5 cc.) was slowly added with stirring to cold (−10° C.) pyridine saturated with hydrogen sulfide. The reaction was continued for an additional three hours at −10° C. while a continuous stream of hydrogen sulfide was bubbled through the solution. The reaction mixture was worked up by diluting with ethyl ether and washing the ether solution successively three times with ice-cold dilute hydrochloric acid, once with saturated sodium bicarbonate solution, and finally with water. After drying the ether solution over anhydrous sodium sulfate and evaporating the solvent, a residual solid was obtained having E(1%, 1 cm.)(333 mμ)=1400. The infrared absorption spectrum of the product showed that although nearly complete reaction of the aldehyde group had occurred, no detectable amount of a thiapyran compound was formed (strong CH=CH band at 10.3μ and absence of C—S band at 14.3μ).

*Example XXV*

A solution of desmethyl vitamin A aldehyde,

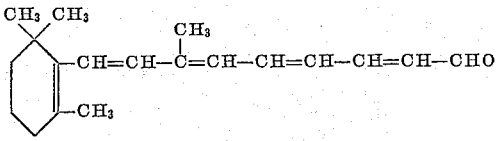

(2 g.) in pyridine (5 cc.) was slowly added with stirring to cold (−10° C.) aniline (40 cc.) saturated with hydrogen sulfide. The reaction was continued for four hours at −10° with a continuous stream of hydrogen sulfide flowing through the solution. The reaction mixture was then worked up as in Example XXIV to give a product (2.0 g.) having E(1%, 1 cm.)(320 mμ)=685. Its infrared absorption spectrum (strong trans-CH=CH-band at 10.3μ and absence of C—S band at 14.3μ) indicated that no thiapyran was formed in the reaction.

Conventional nomenclature is used herein with respect to the numbering of the carbon atoms of the ionyl ring of the aldehydic reactants of the vitamin A series and the resulting carotenoid products. The numbering of the substituents in the ionyl ring of the aldehydic reactants is as follows,

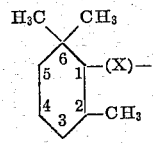

while the numbering of the substituents in the ionyl rings of the carotenoid product is as follows,

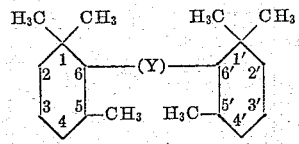

The present invention thus provides a new class of heterocyclic compounds, and particularly, substituted thiapyrans. As described, the present substituted thiapyrans have considerable utility as precursors for highly unsaturated compounds such as β-carotene and related symmetrical polyenes.

Although the present invention has been described in considerable detail with reference to certain preferred embodiments thereof, it will be understood that variations and modifications can be effected within the spirit and scope of the invention as described hereinabove and as defined by the appended claims.

This application is a continuation-in-part of our co-pending applications U.S. Serial No. 798,574, filed March 11, 1959, and U.S. Serial No. 798,577, filed March 11, 1959, both now abandoned.

We claim:

1. The process which comprises reacting at a temperature in the range of −40° C. to 15° C. hydrogen sulfide and an unsaturated aldehyde having the formula

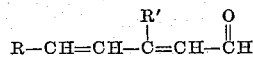

and forming a substituted thiapyran having the formula

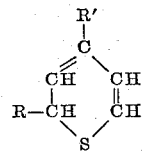

wherein R' is a methyl radical and wherein R is a monovalent organic radical having a formula selected from the group consisting of

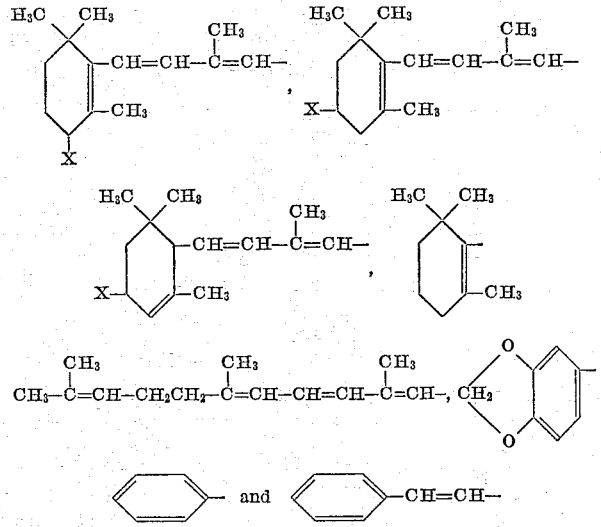

and wherein X is selected from the group consisting of hydrogen atoms, oxo radicals having the formula =O, alkoxy radicals and acyloxy radicals having the formula

wherein R" is an alkyl radical, and thereafter desulfurating said substituted thiapyran at an elevated temperature in the range of 35° C. to 125° C. to form a compound having the formula

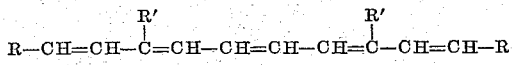

2. The process which comprises reacting at a temperature in the range of −40° C. to 15° C. hydrogen sulfide and an unsaturated aldehyde having the formula

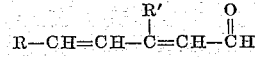

and forming a substituted thiapyran having the formula

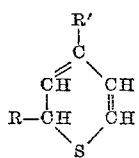

wherein R is a monovalent organic radical terminating in an ionyl ring having the formula

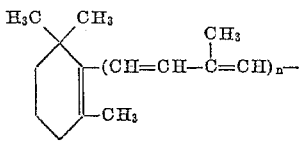

wherein n is an integer of 0 to 1 and wherein R' is a methyl radical, and thereafter desulfurating said substituted thiapyran at an elevated temperature in the range of 35° C. to 125° C. to form a compound having the formula

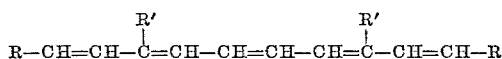

3. The process which comprises reacting vitamin A aldehyde with hydrogen sulfide at a depressed temperature in the range of —40° C. to 15° C. to form a sulfur-containing vitamin A derivative having the formula

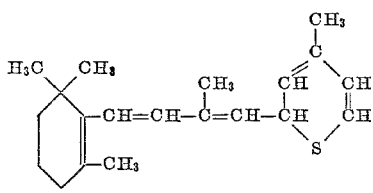

and thereafter desulfurating the said derivative at an elevated temperature in the range of 35° C. to 125° C. to form β-carotene.

4. The process which compirses reacting vitamin A aldehyde with hydrogen sulfide in an organic amine solvent reaction medium at a temperature in the range of —40° C. to 15° C. to form a sulfur-containing vitamin A derivative having the formula

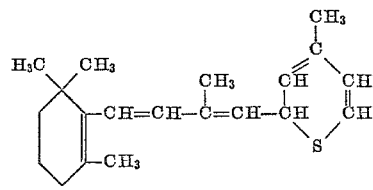

and thereafter desulfurating the said derivative at an elevated temperature in the range of 35° C. to 125° C. to form β-carotene.

5. The process according to claim 4 wherein the organic amine solvent is pyridine.

6. The process according to claim 4 wherein the organic amine solvent is aniline.

7. The process which comprises reacting 2-cis,6-trans vitamin A aldehyde with hydrogen sulfide at a temperature in the range of —40° C. to 15° C. to form a sulfur-containing vitamin A derivative having the formula

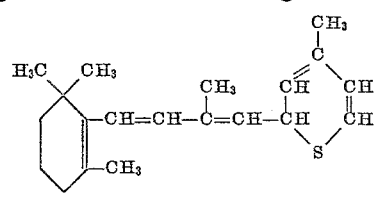

and thereafter desulfurating said derivative at an elevated temperature in the range of 35° C. to 125° C. to form β-carotene.

8. The process which comprises reacting 2,6-trans,trans vitamin A aldehyde with hydrogen sulfide at a temperature in the range of —40° C. to 15° C. to form a sulfur-containing vitamin A derivative having the formula

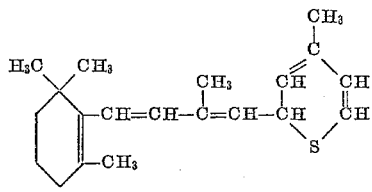

and thereafter desulfurating said derivative at an elevated temperature in the range of 35° C. to 125° C. to form β-carotene.

9. The process which comprises reacting vitamin A aldehyde with hydrogen sulfide at a temperature in the range of —40° C. to 15° C. to form a sulfur-containing vitamin A derivative having the formula

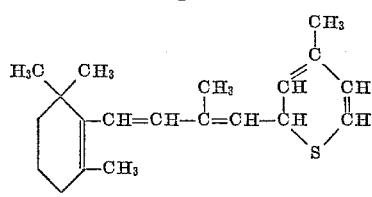

and thereafter treating said derivative at an elevated temperature in the range of 35° C. to 125° C. in the presence of a metal desulfurating agent selected from the class consisting of copper, zinc and zinc-amalgam to form β-carotene.

10. The process which comprises reacting vitamin A aldehyde with hydrogen sulfide at a temperature in the range of —40° C. to 15° C. to form a sulfur-containing vitamin A derivative having the formula

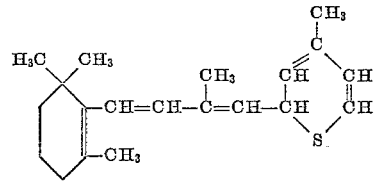

and thereafter treating said derivative under substantially anhydrous conditions at an elevated temperature in the range of 35° C. to 125° C. in the presence of a desulfurating agent selected from the class consisting of alkoxides having the formulas $Al(OR)_3$ and $B(OR)_3$ wherein R is an alkyl radical having 1 to 8 carbon atoms and thereby forming β-carotene.

11. The process for preparing β-carotene which comprises reacting vitamin A aldehyde with hydrogen sulfide in an organic amine solvent reaction medium at a temperature in the range of —20° C. to 10° C. to form a sulfur-containing vitamin A derivative having the formula

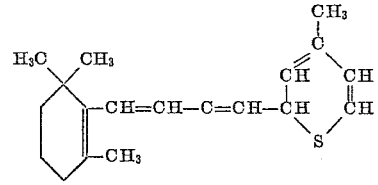

and thereafter converting said derivative to β-carotene by desulfurating said derivative in an amine solvent medium in the presence of at least about 0.1 part by weight of zinc-amalgam to each part by weight of said derivative at a temperature in the range of 50° C. to 125° C.

12. The process for preparing β-carotene which comprises reacting vitamin A aldehyde with hydrogen sulfide in an aniline reaction medium at a temperature in the range of —20° C. to 10° C. to form a sulfur-containing vitamin A derivative having the formula

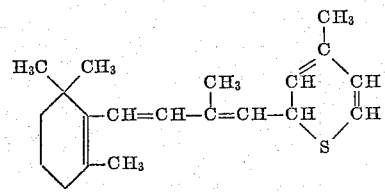

and thereafter converting said derivative to β-carotene by desulfurating said derivative in a pyridine reaction medium in the presence of at least about 0.1 part by weight of zinc-amalgam to each part by weight of said derivative at a temperature in the range of 50° C. to 125° C.

13. The process for preparing β-carotene which comprises reacting vitamin A aldehyde with hydrogen sulfide in an organic solvent reaction medium at a temperature in the range of —20° C. to 10° C. to form a sulfur-containing vitamin A derivative having the structural formula

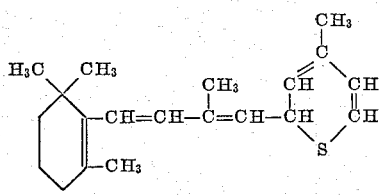

desulfurating said derivative to β-carotene in a substantially inert organic solvent at a temperature in the range of 50° C. to 125° C.

14. The process according to claim 13 wherein the vitamin A aldehyde is 2-cis,6-trans vitamin A aldehyde.

15. The process according to claim 13 wherein the vitamin A aldehyde is 2,6-trans,trans vitamin A aldehyde.

References Cited in the file of this patent

UNITED STATES PATENTS

| | | |
|---|---|---|
| 1,604,235 | Odom | Oct. 26, 1926 |
| 1,692,756 | Moran | Nov. 20, 1928 |
| 2,566,815 | Whetstone | Sept. 4, 1951 |
| 2,603,650 | Schmerling | July 15, 1952 |
| 2,636,022 | Brooks | Apr. 21, 1953 |
| 2,742,463 | Finkelstein | Apr. 17, 1956 |
| 2,819,316 | Oroshnik | Jan. 7, 1958 |
| 2,835,713 | Robeson | May 20, 1958 |
| 2,866,753 | Ayers | Dec. 30, 1958 |
| 2,891,072 | Remes et al. | June 16, 1959 |
| 2,990,430 | Stern | June 27, 1961 |

FOREIGN PATENTS

| | | |
|---|---|---|
| 710,275 | Germany | Sept. 9, 1941 |

OTHER REFERENCES

Richter's Org. Chem., vol. IV, pp. 175 and 193, Elsevier Pub. Co. Inc., N.Y. (1947).

Campaigne: "Chem. Reviews," vol. 39, pp. 5–7 (1946).

Elsevier: Chemistry of Carbon Compounds, vol. 11A, "Alicyclic Compounds," p. 424, Elsevier Publishing Co., Amsterdam, Holland (1953).

Chemical Abstracts, vol. 43 (1949), abstract of Farmer et al., Naylor and Bloomfield, J. Chem. Soc., 1947, pp. 1519–51.